(12) United States Patent
DeBie

(10) Patent No.: US 7,979,398 B2
(45) Date of Patent: Jul. 12, 2011

(54) PHYSICAL TO ELECTRONIC RECORD CONTENT MANAGEMENT

(75) Inventor: Tod DeBie, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/615,853

(22) Filed: Dec. 22, 2006

(65) Prior Publication Data

US 2008/0154956 A1    Jun. 26, 2008

(51) Int. Cl.
*G06F 17/00* (2006.01)

(52) U.S. Cl. ........ 707/662; 707/610; 707/640; 707/661; 707/665; 707/667; 707/672; 707/673; 707/674; 707/689; 707/690; 707/692; 707/694; 707/696; 707/791; 707/802; 707/822; 707/828; 711/170; 711/100; 382/305; 382/306; 382/312; 382/321

(58) Field of Classification Search .................... 707/10, 707/610, 640, 661, 665, 667, 672, 673, 674, 707/689, 690, 692, 694, 696, 791, 802, 822, 707/828, 999.204, 999.1, 999.103, 999.009; 711/170, 100; 382/305, 306, 321, 312
See application file for complete search history.

(56) References Cited

U.S. PATENT DOCUMENTS

| | | | |
|---|---|---|---|
| 5,276,901 A | 1/1994 | Howell et al. | |
| 5,410,667 A * | 4/1995 | Belsan et al. | 711/114 |
| 5,692,178 A | 11/1997 | Shaughnessy | |
| 5,701,458 A | 12/1997 | Bsaibes et al. | |
| 5,813,009 A * | 9/1998 | Johnson et al. | 707/100 |
| 5,892,900 A | 4/1999 | Ginter et al. | |
| 5,917,912 A | 6/1999 | Ginter et al. | |
| 5,921,582 A * | 7/1999 | Gusack | 283/67 |
| 6,134,552 A * | 10/2000 | Fritz et al. | 707/10 |
| 6,208,993 B1 | 3/2001 | Shadmon | |
| 6,236,994 B1 | 5/2001 | Swartz et al. | |
| 6,480,851 B1 | 11/2002 | Terek | |
| 6,519,571 B1 | 2/2003 | Guheen et al. | |
| 6,553,365 B1 | 4/2003 | Summerlin et al. | |
| 7,233,959 B2 | 6/2007 | Kanellos et al. | |
| 7,478,088 B2 | 1/2009 | Summerlin et al. | |
| 7,594,082 B1 | 9/2009 | Kilday et al. | |
| 2002/0111960 A1* | 8/2002 | Irons et al. | 707/204 |
| 2002/0161602 A1* | 10/2002 | Dougherty et al. | 705/1 |
| 2003/0041198 A1 | 2/2003 | Exton et al. | |
| 2003/0088784 A1 | 5/2003 | Ginter et al. | |
| 2003/0130993 A1 | 7/2003 | Mendelevitch et al. | |
| 2003/0195866 A1* | 10/2003 | Long et al. | 707/1 |
| 2003/0200234 A1* | 10/2003 | Koppich et al. | 707/203 |

(Continued)

OTHER PUBLICATIONS

U.S. Appl. No. 11/317,712, filed Dec. 23, 2005, entitled "Dynamic Holds of Record Dispositions During Record Management", invented by T. DeBie.

(Continued)

*Primary Examiner* — Syling Yen
(74) *Attorney, Agent, or Firm* — Janaki K. Davda; Konrad Raynes & Victor LLP

(57) ABSTRACT

Techniques provide a file plan including a plurality of containers, wherein each container is capable of providing management information for record information objects assigned to the container, wherein the record information objects represent documents, wherein one of the containers points to a physical record. An electronic record associated with the physical record is stored. The physical record is automatically associated with the electronic record by updating the file plan.

18 Claims, 10 Drawing Sheets

U.S. PATENT DOCUMENTS

| | | |
|---|---|---|
| 2003/0227487 A1 | 12/2003 | Hugh |
| 2003/0229623 A1 | 12/2003 | Chang et al. |
| 2004/0225730 A1 | 11/2004 | Brown et al. |
| 2005/0102297 A1* | 5/2005 | Lloyd et al. .................... 707/100 |
| 2005/0165734 A1 | 7/2005 | Vicars et al. |
| 2005/0171914 A1* | 8/2005 | Saitoh ............................. 705/51 |
| 2005/0216467 A1 | 9/2005 | Urakawa et al. |
| 2005/0216524 A1 | 9/2005 | Gomes et al. |
| 2005/0262132 A1 | 11/2005 | Morita et al. |
| 2006/0080316 A1* | 4/2006 | Gilmore et al. .................... 707/9 |
| 2006/0085245 A1 | 4/2006 | Takatsuka et al. |
| 2006/0085374 A1 | 4/2006 | Mayes et al. |
| 2006/0101019 A1 | 5/2006 | Nelson et al. |
| 2006/0149735 A1 | 7/2006 | DeBie et al. |
| 2006/0173932 A1* | 8/2006 | Cortright et al. .............. 707/204 |
| 2006/0230044 A1* | 10/2006 | Utiger ............................. 707/10 |
| 2006/0288050 A1 | 12/2006 | Wilson |
| 2007/0005595 A1 | 1/2007 | Gafter |
| 2007/0033191 A1* | 2/2007 | Hornkvist et al. ................. 707/9 |
| 2007/0088585 A1 | 4/2007 | Maguire |
| 2007/0088736 A1 | 4/2007 | DeBie |
| 2007/0130165 A1* | 6/2007 | Sjoblom et al. ................. 707/10 |
| 2007/0136397 A1 | 6/2007 | Pragada et al. |
| 2007/0220001 A1 | 9/2007 | Faden |
| 2007/0226320 A1 | 9/2007 | Hager et al. |
| 2007/0244899 A1 | 10/2007 | Faitelson et al. |
| 2008/0022361 A1* | 1/2008 | Bharadwaj et al. ............... 726/2 |
| 2009/0055397 A1 | 2/2009 | Man et al. |
| 2009/0077087 A1 | 3/2009 | Urano et al. |

OTHER PUBLICATIONS

U.S. Appl. No. 11/401,994, filed Apr. 11, 2006, entitled "Managing Content Objects Having Multiple Applicable Retention Periods", invented by T. DeBie.

US Patent Application filed Dec. 22, 2006, entitled "Using an Access Control List Rule to Generate an Access Control List for a Document Included in a File Plan", invented by T. DeBie.

US Patent Application filed Dec. 22, 2006, entitled "Applying Multiple Disposition Schedules to Documents", invented by T. DeBie.

US Patent Application filed Dec. 22, 2006, entitled "File Plan Import and Sync Over Multiple Systems", invented by T. DeBie.

* cited by examiner

RIO

PHYSICAL TO ELECTRONIC RECORD CONTENT MANAGEMENT

BACKGROUND OF THE INVENTION

1. Field of the Invention

The present invention relates to a method, system, and computer program product for physical to electronic record content management.

2. Description of the Related Art

Enterprise content management systems facilitate managing a variety of information/content (documents) and processes that use such information during the course of enterprise operations. Documents, as used herein, refer to any identifiable logical/physical units of information, including content and transactions generated by the enterprise. A document may comprise an electronic file, object, program, database, image, email, message, etc. or a physical item, such as a paper, file, cassette recording, model, etc. Documents stored in the content management system may not initially be managed as part of a records management system until they go through a "declaration" procedure that creates a corresponding record information object (RIO) for the document. Each RIO may include metadata and a reference to the declared document. The metadata describes/characterizes the declared document. The reference is, for example, a location of the document maintained in an electronic file system or database maintained in a computer-readable media. Alternatively, in the case of a physical document, the reference specifies a physical document location (e.g., a box number, a file cabinet, etc.) where the document is located. Once declared as a record, a document is managed/accessed via the content management system and access to the declared document takes place via the content management system.

Other techniques may not use the RIO/reference model and may instead directly attach record information or metadata to the document or object itself or use other means to track and/or manage records.

The scope of content represented by RIOs is not limited to any particular type of document form or location. A variety of document types are potentially referenced by the RIOs of the records manager. Such document types include, by way of example: formal documents such as permits, invoices, tax records, patents, contracts, claims, manuals etc; informal documents such as email messages (and attachments), text messages, meeting notes, etc.; multimedia content such as audio, video files; and physical containers such as file boxes, cabinets, folders, etc. The documents referenced by the RIOs are potentially stored in a variety of forms and locations. For example, electronic documents including images, text files, forms, etc. are potentially stored in file systems and databases. Physical documents referenced by RIOs are potentially stored in cabinets, boxes, file folders, etc.

After declaring a document, the associated RIO is maintained in an electronic object storage facility referred to as a "file plan object store" including one or more "file plans". In certain cases, file plans for documents may be maintained without a file plan object store. Each file plan comprises an outline/definition for record management based upon a hierarchically arranged set of categories (classes/subclasses) and containers for classifying/organizing/maintaining the RIOs and their associated declared documents. A known file plan arrangement for storing records includes the following containers: categories/sub-categories, record folders, and record volumes. In addition to defining a taxonomy of document types declared within the system, the file plan supports specifying management rules for RIOs placed within particular document categories and sub-categories. Such rules include user role-based access/permissions to RIOs and their associated documents, and defining disposition schedules specifying when particular disposition actions (e.g., transfer, review, destroy, archive, etc.) are to be taken with respect to documents declared under the category. Thus, the known file plan structure can be visualized as a hierarchical tree structure where nodes potentially specify distinct containers (e.g., category or container of categories). Each category within the file plan potentially specifies a set of properties and lifetime document management rules for associated document records.

Also, as an example, a file plan may consist of categories, folders, volumes, schedules, events, actions, workflows, cycles, etc.

The file plan supports multiple ways of associating disposition schedules with RIOs. A disposition schedule may be associated with a record category/sub-category, a record folder, or a record type. Thus, a record folder including RIOs can have a disposition schedule. Alternatively, in cases where a disposition schedule is not assigned to a record folder including the RIOs, the record folder inherits a disposition schedule associated with a parent record category/sub-category. Finally, a disposition schedule is potentially associated with a particular record type.

A disposition schedule may be provided for a record by associating the disposition schedule directly with the RIO for the record. Further, a document inherits the disposition schedule associated with the record folder under which the RIO for the document is declared. In cases where disposition schedules are specified at both category and folder levels, the disposition schedule associated with the container including the RIO or closest ancestor container to container including the RIO is applied.

Furthermore, as noted above, a disposition schedule is potentially associated with a record type. Therefore, the default disposition schedule for a RIO (based upon the RIO's position in the file plan hierarchy) is overridden by defining a new record type, associating an overriding disposition schedule with the new record type, and assigning the new record type to the RIO. Thus, when different disposition schedules are associated with the record category, record folder, and record type associated with a RIO, then the RIO adopts the overriding disposition schedule from the record type. Alternatively, the disposition schedule may be associated or applied directly to the document or object, without using an intermediate RIO or file plan.

A disposition schedule seeks to effectively manage the disposition of documents in an enterprise. For example, with regard to scheduled document destruction, maintaining documents beyond their specified/intended lifespan potentially consumes limited resources (e.g., warehouse shelf space, office cabinets/drawers, electronic storage devices, etc.). Failure to remove records can also degrade the performance of the system itself due to the need to actively check/track record objects within file plans until their corresponding documents are destroyed. However, destroying documents before the end of their intended lifespan can result in penalties/fines for violations of government guidelines/regulations or damages for breaches of contractual obligations.

Records management applications may be integrated with the enterprise content management systems to define and apply disposition schedules to declared documents. The records manager may include an interface for defining a file plan taxonomy including declared document record types/containers and associated schedules/rules. Furthermore, the records manager supports declaring documents in the system and appending their corresponding RIOs to an appropriate hierarchical node of a file plan (thereby associating a particular file plan-based disposition schedule with the RIO). Thereafter the records manager invokes methods/operations supported by an interface provided by the content engine to perform a "sweep" operation that traverses the file plan and applies corresponding disposition schedules defined for corresponding categories/sub-categories within the file plan.

The disposition schedules created and applied by the records manager define retention rules for documents declared as records (i.e., "declared documents" represented by RIOs in the file plan) and instructions for disposing the declared documents when a retention period ends. The various potential disposition actions specified by the instructions include: review, transfer to archive (for permanent preservation), export to another location, and destruction. Each of the various disposition actions is a potential phase of a declared document's lifespan, and each phase includes a specified retention rule/period and an action to be performed when the retention period ends. A retention period can be extended by designating a hold on a RIO.

Disposition schedules (including periods and actions) are defined by any of a number of supported disposition schedule parameter types defining control of retention of RIOs. A disposition schedule potentially comprises multiple, sequential or concurrent disposition phases that are defined to retain RIOs in a particular state for a defined time period. The following parameters are potentially used to define a phase in a disposition schedule assigned to a particular category/sub-category container of a file plan—and the RIOs contained therein. An "event" specifies a trigger for commencement of a cutoff for contained/referenced record entities. A "cutoff" comprises closing entities at a specified interval to commence disposition actions on the entities. Thus, cutoff is used, for example, to end active use of a record. An "offset" specifies a time gap between registering an event and launching an associated cutoff action. A "cutoff action" specifies a disposition action performed automatically on an entity once a cutoff is triggered by an event and/or any specified offset period has expired. A "phase disposition instruction/action" parameter specifies a manually initiated action that is to be performed upon completion of a phase. Examples of disposition instructions/actions are review, transfer to archive (for permanent preservation), export, and destroy. Furthermore, each disposition instruction/action is associated with a workflow. When the disposition action is initiated, the system launches the workflow comprising a set of instructions to be executed upon an affected record.

The records manager may be used to define applicable dispositions that are mutually exclusive even though no more than one disposition schedule is actively applied to a particular RIO instance within a file plan. The active disposition schedule for any particular RIO in a file plan is determined according to the above-described precedence scheme. Furthermore, only one triggering event/offset combination can be specified within any particular phase of a disposition schedule assigned to a record type or node (e.g., category, folder, etc.) of a file plan. Thus, if a phase disposition instruction/action (e.g., document destruction) is not to be performed until completion of multiple events, then multiple RIOs (stored at multiple locations in one or more file plans) and multiple disposition schedules are created to handle the set of potentially controlling sequences of events.

Existing records management systems deal with content in whatever state that the content exists in (i.e., physical or electronic) at the time that content is declared. No provision is made to transfer content from one state to another. If someone has physical records declared in a records management system and wants to make them electronic records, that user has to scan the physical records into a content management system and declare the scanned, electronic records as new separate records. Optionally, the user may delete the physical records at some point before the electronic records are deleted.

There is a need in the art for improved techniques for physical to electronic record content management.

SUMMARY

Embodiments provide a file plan including a plurality of containers, wherein each container is capable of providing management information for record information objects assigned to the container, wherein the record information objects represent documents, wherein one of the containers points to a physical record. An electronic record associated with the physical record is stored. The physical record is automatically associated with the electronic record by updating the file plan.

BRIEF DESCRIPTION OF THE DRAWINGS

FIG. 10 illustrates an embodiment of a file plan object store after physical records have been disposed of.

DETAILED DESCRIPTION

Figure 1:
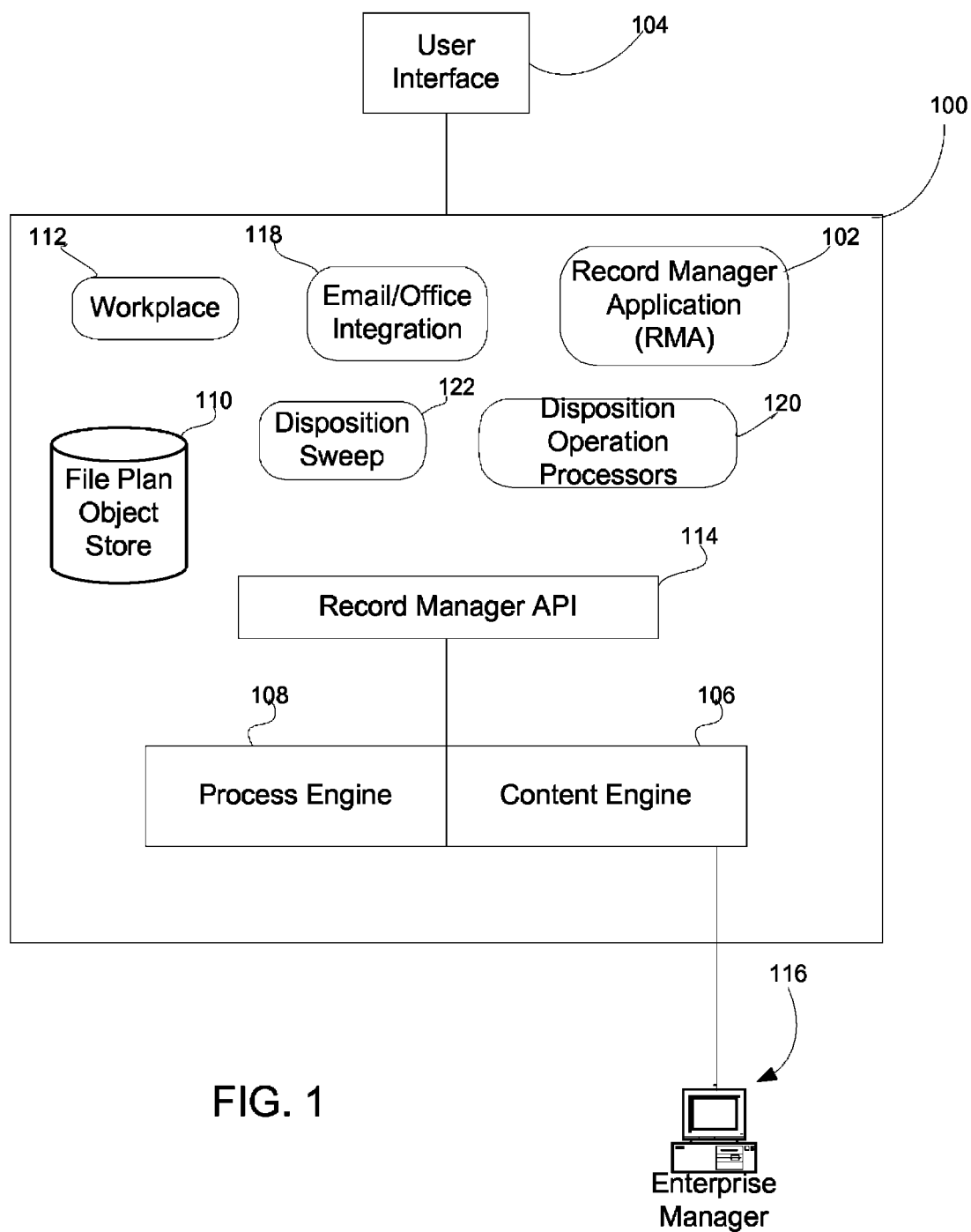
FIG. 1 illustrates an embodiment of a computing environment.

FIG. 1 illustrates an embodiment of a record management system. The record management components execute on a server 100, such as a content server application platform 100, providing a user interface (e.g., Web server) to a variety of content management services via a set of hosted applications. The server 100 comprises an application platform including a collection of components that support records management functionality, including a records manager application 102, The records manager application 102 (RMA) 102 provides an interface for creating file plans and associated sub-component containers including: categories, sub-categories, record folders, etc. The RMA 102 also processes user commands submitted via a user interface 104 (e.g., a web browser) that may run on a connected client system or the server 100 to enable a user to create and manage record information objects (RIOs) stored within the created file plans. In one embodiment, the RMA 102 does not directly manage documents associated with RIOs. Instead, the RMA 102 manages/administers the previous declared documents via calls to a content engine 106 and a process engine 108. The content engine 106 stores classes, properties and event subscriptions that define records management related data.

Figure 2:
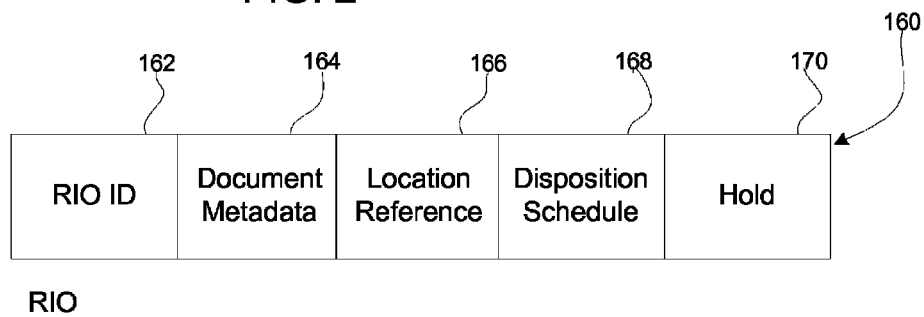
FIG. 2 illustrates an embodiment of information for a record information object.

During a declaration stage, an RIO is created for a new document, and the RIO is stored in a file plan object store 110 (see, FIG. 2). Declaring a new RIO is performed either manually or through automated processes that categorize a newly added electronic document based upon characteristics associated with the electronic document. In the case of automatic declaration of a document, processes automatically analyze the document when it is saved/filed/submitted to the content engine 106. Such analysis involves extraction of, for example, a file system location, file metadata, content within the stored document (e.g., fields within an electronic form), etc. Upon detecting a particular event (e.g., detection of an event and/or expiration of a time period), the RMA 102 initiates actions for disposing (e.g., transfer, review, destroy, archive, etc.) of the document, but not necessarily the corresponding RIO representing the document, from the system.

In one embodiment, the RMA 102 is provided as an "Advanced Author" tool invoked via a workplace application 112 that provides Web access to the functionality of the enterprise content management application. The RMA 102 includes a file plan editor functionality that facilitates defining a hierarchically arranged set (taxonomy) of containers within which RIOs (and their associated declared documents) are stored. RMA 102 further enables the administrator to define one or more disposition schedules for each container (node) defined for a particular file plan.

The RMA 102 enables a user (e.g., a human records manager) via the user interface 104 to create and manage classification schemes (file plans) hierarchically arranging a set of RIOs corresponding to declared documents; create and manage disposition schedules (including potentially assigning multiple disposition schedules to a single container node—e.g., a category, a sub-category, a folder—in a file plan's hierarchy); create and manage the record folders (and folder volumes) that are created under parent container nodes of the file plan; configure the system to specify content engine 106 object classes and properties to manage; create RIOs for managing physical boxes, folders and records; search for categories, folders and records within the file plan hierarchical tree structure; and run pre-defined searches against content engine 106 objects and audit information to generate reports.

In addition to records managers, privileged end users can use RMA 102 to perform tasks such as creating record folders and declaring paper records. In addition, the RMA 102 may be configured with preferences specified under the workplace 112 and leverages the workplace 112 user preference model where applicable. In one embodiment the RMA 102 leverages a records management application program interface (API) 114 providing utilities that support records management functionality. An enterprise manager application 116, which may reside on a separate enterprise manager system or on the server 100, provides an administration tool for managing and creating file plan object stores, defining security, and enabling auditing. The enterprise manager application 116 may enable the following functions: creating object stores and manage services; creating and managing object classes and setting security defaults; configuring auditing; customizing the system to enforce behavior that is customer specific (e.g., customizing events related to records management).

The workplace 112, in addition to providing an entry point into the RMA application 102, provides an interface that end-users and records managers use to capture documents and declare RIOs; declare existing documents as RIOs; participate in record disposition processes via a "tasks" user interface; search for particular RIOs and print search results to generate basic reports; save user favorites (preferences) to aid in classification; and view record content.

Advanced users, records managers and integrators use the "advanced" tools of the workplace 112 such as the process designer and entry template designer to perform the following functions: create document information entry templates that include operations to automate the declaration process; create and modify workflow definitions that define the disposition review process, provide custom disposition actions, and integrate record capture and declaration capability in custom processes; and create custom searches and publishing templates.

An email/office software integration application 118 facilitates declaring mail and other office application documents to be managed in the file plan. Additional functionality provided for records management includes the automated capture of email transmission data as well as support for capturing attachments as separate documents that are linked to the message body.

The content engine 106 provides the repository services for storing file plans and records and is responsible for enforcing security and auditing. The content engine 106 includes a set of application program interfaces that support administering declared/registered documents within the system. The interfaces of the content engine 106 are called by a variety of applications/components of the content management server application platform 100 to implement a variety of functions/services including, in addition to the aforementioned disposition actions, the following: object repository, content storage, content retrieval, version management, relation management, security, content classification, event notifications/subscriptions, document lifecycle management, content searches, etc.

The process engine 108 provides workflow services that support records disposition processes/actions. The actions include process execution, process routing, rules management, process simulation and modeling, and workflow analysis. The process engine 108 may invoke one or more disposition sweeps 122, which represent a set of periodic/scheduled processes that wake up and perform a scan on the set of RIOs in a file plan, calculate record disposition action schedules, and collect a set of responsive RIOs for which disposition actions are presently due for presentation to a user for carrying out the associated disposition actions on the identified records. A set of disposition operation processors 120 provides user interfaces for reviewing record dispositions. The disposition operation processors 120 may be invoked via the workplace 110.

FIG. 2 illustrates an embodiment of information included in an RIO 160, including an RIO identifier 162; document metadata 164 providing information on the document represented by the RIO, such as the document type, attributes of the document, and document content; a location reference 166 indicating the location of the document or object represented by the RIO; a disposition schedule 168 indicating an RIO level schedule for disposing of the document represented by the RIO; and a hold 170 comprising an RIO level hold to override any attempt to dispose of the document represented by the RIO. The RIO level disposition schedule 166 and hold 168 are optional, and may not be provided. The document referenced by the location reference 166 may comprise an electronic document, program or object. In such case, the location reference 166 provides the logical address that may be used to access the represented document. Alternatively, the document referenced by the location reference 166 may comprise a physical item. In such case, the location reference 166 indicates a physical location, such as floor, building, shelf, box, etc.

For instance, the RIO may represent documents comprising word processor documents, email messages, and graphics files; physical records, such as paper records, videotapes, portable storage media; vital records required for meeting operational responsibilities during an enterprise-wide emergency; permanent records identified as having sufficient historical or other value to warrant continued preservation by the organization beyond the time it is normally required for administrative, legal, or fiscal purposes.

Figure 3:
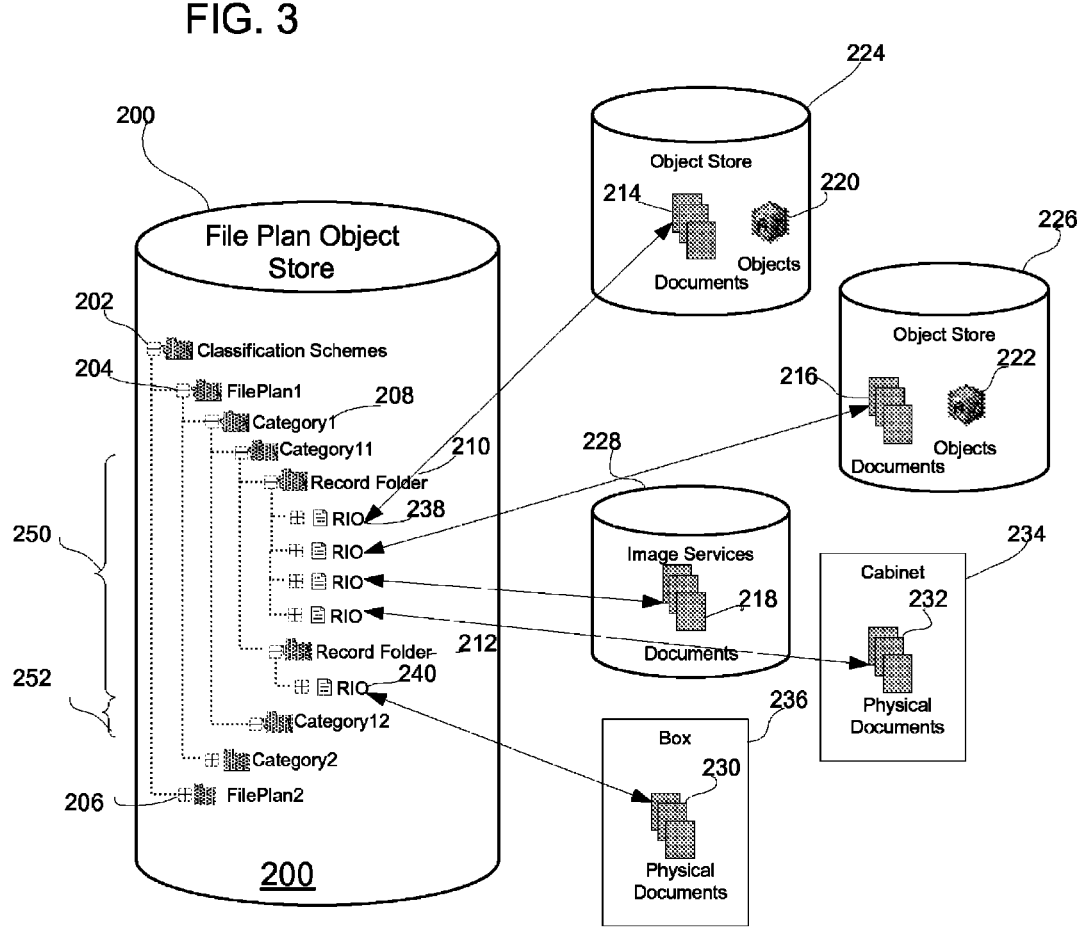
FIG. 3 illustrates an embodiment of a file plan object store.

FIG. 3 illustrates an embodiment of a file plan object store 200 comprising hierarchically arranged containers, where each container in the hierarchy may include other descendent containers, e.g., file plans, folders, record folders, categories, etc., and RIOs. A file plan object store 200 may be described as an object store that is enabled to contain a file plan. In one embodiment, the highest level node in the file plan object store 200 comprises a classification scheme node 202. At a next level, a set of file plans 204, 206 are each assigned to separate nodes. Each file plan defines an organization of records. Each file plan 204, 206 (e.g., FilePlan I) defines a hierarchy for storing RIOs such that their context is preserved. For example, in one embodiment a file plan hierarchy may reflect business functions of an enterprise. A record category (e.g., Category1 208) provides a first level of organization of RIOs under a file plan node of the exemplary hierarchical document record organization structure. Record categories are created to classify records based on functional categories. Examples of typical descriptive categories within a business enterprise are "Human Resources", "Accounting", "R&D", "Legal", "Marketing", etc. The record categories potentially contain either a sub-category container (e.g., Category 11, Category 12) or a record folder container. Sub-category containers hold other sub-categories or record folders. Record folders contain actual RIOs 160.

A record folder 210, 212 serves as a container/collection of related RIOs. Record folders are used to manage RIOs according to retention periods, disposition events, and holds specified by their associated containers. The RIOs location references 166 (FIG. 2) may reference electronic documents 214, 216, 218 and objects 220, 222 (e.g., databases, programs, etc.) stored in electronic storage media in object stores 224, 226 or facilities 228. RIOs may also reference physical documents or items 230, 232 stored in a physical location, such as a cabinet 234 or box 236. Examples of physical documents stored in boxes 236 and cabinets 234 include large building plans, videotapes, or a database. The cabinet 234 and box 236 constructs provide mechanisms to model physical entities that contain other physical entities. For example, a "warehouse" contains "shelves" that contain "boxes" that contain the aforementioned physical folders. A box construct may contain another box, a physical folder, or a record. Hybrid folders are used as containers for a collection of related electronic and physical records.

The RIO nodes, e.g., 238, 240, in the file plan 200 reference and represent RIOs 160. The RIO nodes 238, 240 may comprise the RIO 160 itself or a pointer to the RIO 160 in a database or other location. An RIO may inherit file management rules (e.g., disposition schedules and holds) from the immediate record folder 210, 212 in which it is included.

In FIG. 3, Category 11 and its children may be designated as one segment 250, and Category 12 and its children may be another segment 252.

Figure 4:
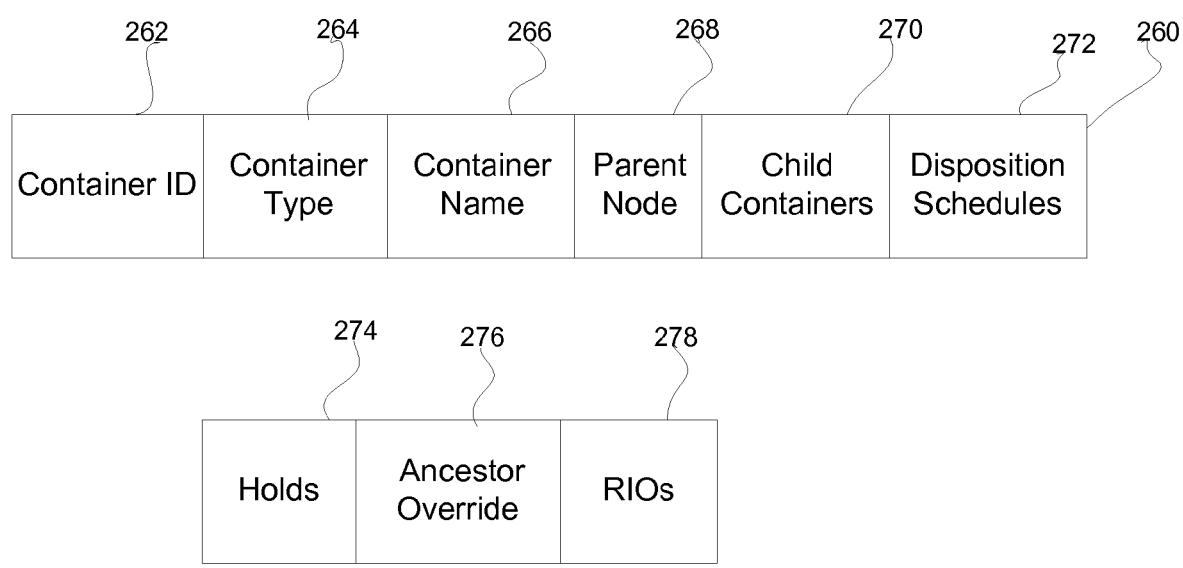
FIG. 4 illustrates an embodiment of information for a container in a file plan.

FIG. 4 illustrates an embodiment of container information 260 maintained for each container generated in a file plan. As discussed a container may comprise a classification scheme, file plan, category, record folder, or other logical subdivision of RIOs. The container information 260 includes:
  container type field 262 indicating whether the container comprises a file plan, category, a sub-category, a record folder, etc.;
  container identifier (ID) 264 indicating a unique ID of the container;
  container name field 266 comprising a name associated with the container node (e.g., "Category1");
  parent node field 268 indicating a direct parent node/container for the container in the file plan hierarchy;
  child containers 270 comprising a list of all children containers (if any) within the container;
  disposition schedules 272, if any, associated with the container, where each disposition schedule may provide a different rule for determining when to dispose (e.g., transfer, review, destroy, archive) of a document represented by an RIO included in the container, either directly or within a container that is a descendant of the container;
  hold rules 274 indicating whether the document should be retained notwithstanding a disposition schedule indicating that the document represented by the RIO within the container should be disposed;
  ancestor override flag 276 indicates whether disposition schedules from containers that are ancestors to the current container including the RIO should be applied to the RIOs within the current container;
  RIOs 278: a list of RIOs included within the container.

Figure 5:
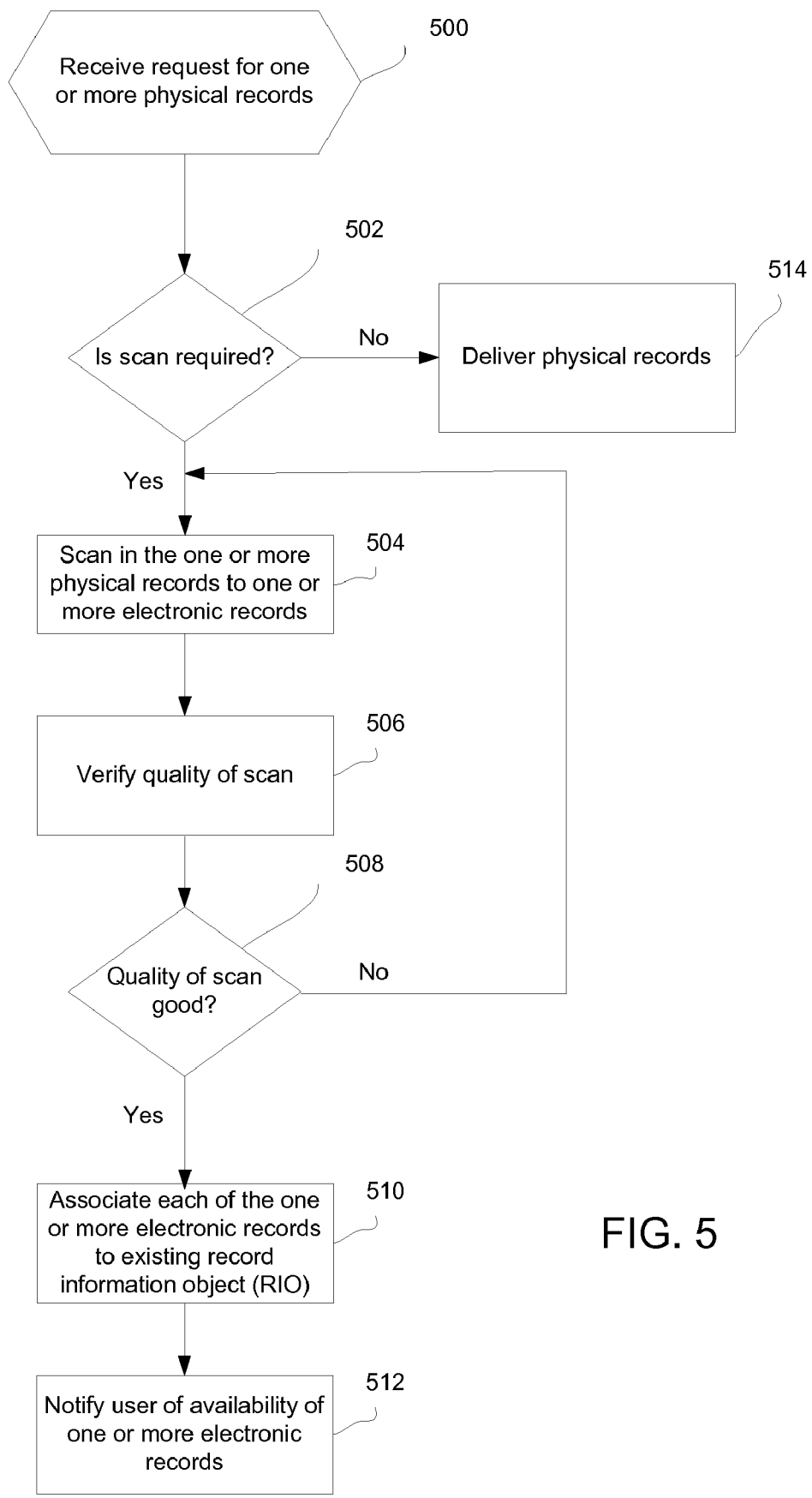
FIG. 5 illustrates an embodiment of logic to convert one or more physical records to one or more electronic records.

FIG. 5 illustrates an embodiment of logic to convert one or more physical records to one or more electronic records. Control begins at block 500 with receipt of a request for one or more physical records. In certain embodiments, the request is generated by an event or workflow that is launched to request an individual or group of physical records to be converted and/or delivered, with an option set to scan them as electronic records or an indicator on the class or category to require scanning when retrieved.

In block 502, either the RMA 102 or a user determines whether a scan is required. In certain embodiments, the RMA 102 is able to access information indicating whether the scan is required. In certain embodiments, a user accesses such information. If so, processing continues to block 504, otherwise, processing continues to block 514. A user may be described as anyone involved in the process of FIG. 5. Also, different users may perform the different operations described in FIG. 5.

In block 504, a user scans the one or more physical records to one or more electronic records. In certain embodiments, multiple physical records may be scanned to form one electronic document. In other embodiments, multiple physical documents are scanned as separate electronic records. In block 506, a user verifies the quality of the scan. In block 508, if the quality of the scan is good, processing continues to block 510, otherwise, processing loops back to block 504, and the one or more physical records are re-scanned. In block 510, the RMA 102 associates each of the one or more electronic records to an existing RIO with which the physical record is associated. In certain embodiments, each physical record or group of physical records has an RIO. Via a user interface, a user who scans in the one or more physical records to create an electronic record, identifies the RIO of the corresponding physical record with which the electronic record is to be associated, and the RMA 102 associates the electronic record with that RIO. In certain embodiments, using metadata, user provided information or other means, the RMA 102 automatically associates the electronic record to the same RIO that the one or more physical records are currently associated with. In certain embodiments, the RMA 102 or a user optionally creates a new RIO for the electronic record and links the new RIO with an existing RIO that corresponds to the physical record to show that they are associated with a same document.

In block 512, the RMA 102 notifies a user of the availability of the one or more electronic record. Alternatively, if a scan is not required, in block 514, the physical records are delivered.

Figure 6:
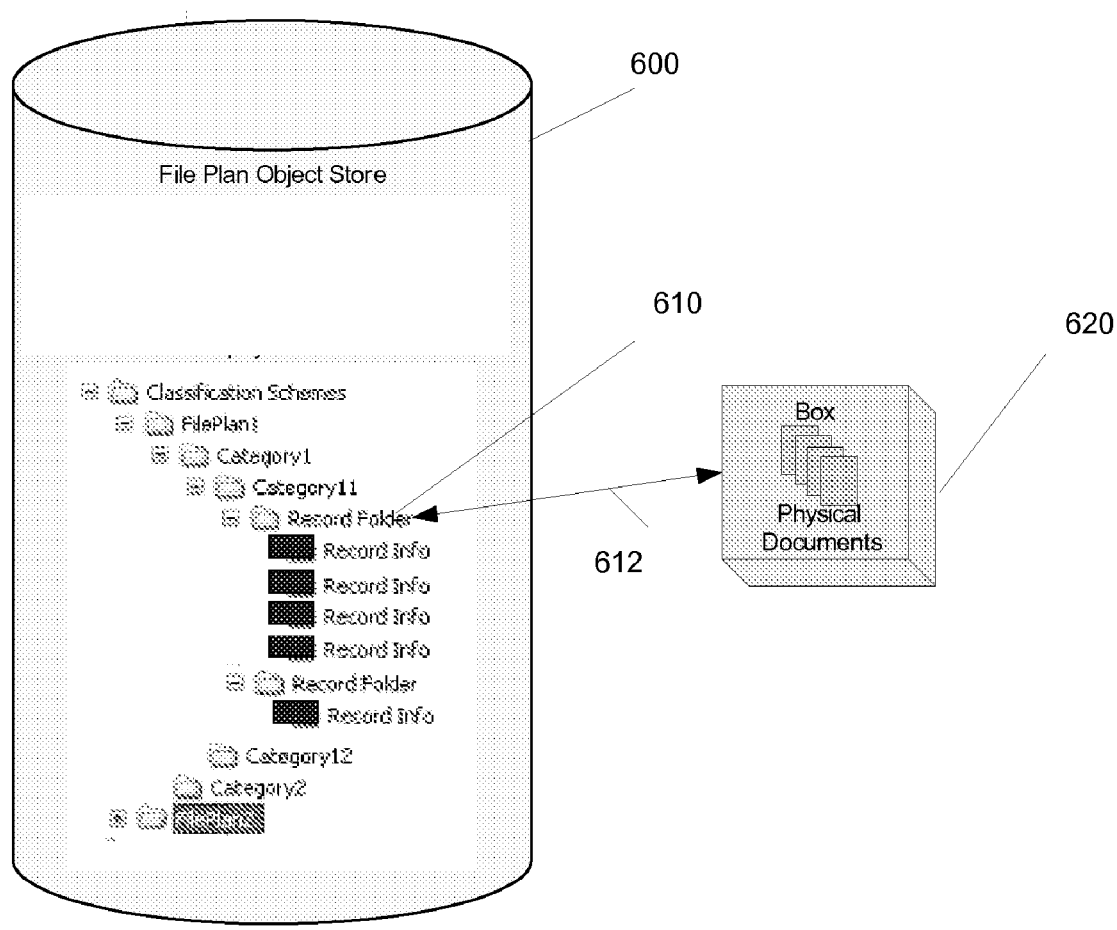
FIG. 6 illustrates an embodiment of a file plan object store and physical records.

FIG. 6 illustrates an embodiment of a file plan object store 600 and a box of physical records 620. The file plan object store 600 manages classification schemes, retention schedules, and record folders. The file plan object store 600 also contains links (e.g., pointers) to a box of physical records (illustrated as "documents"). In FIG. 6, the file plan object store 600 includes a record folder 610 with a link 612 to the box of physical records 620.

Figure 7:
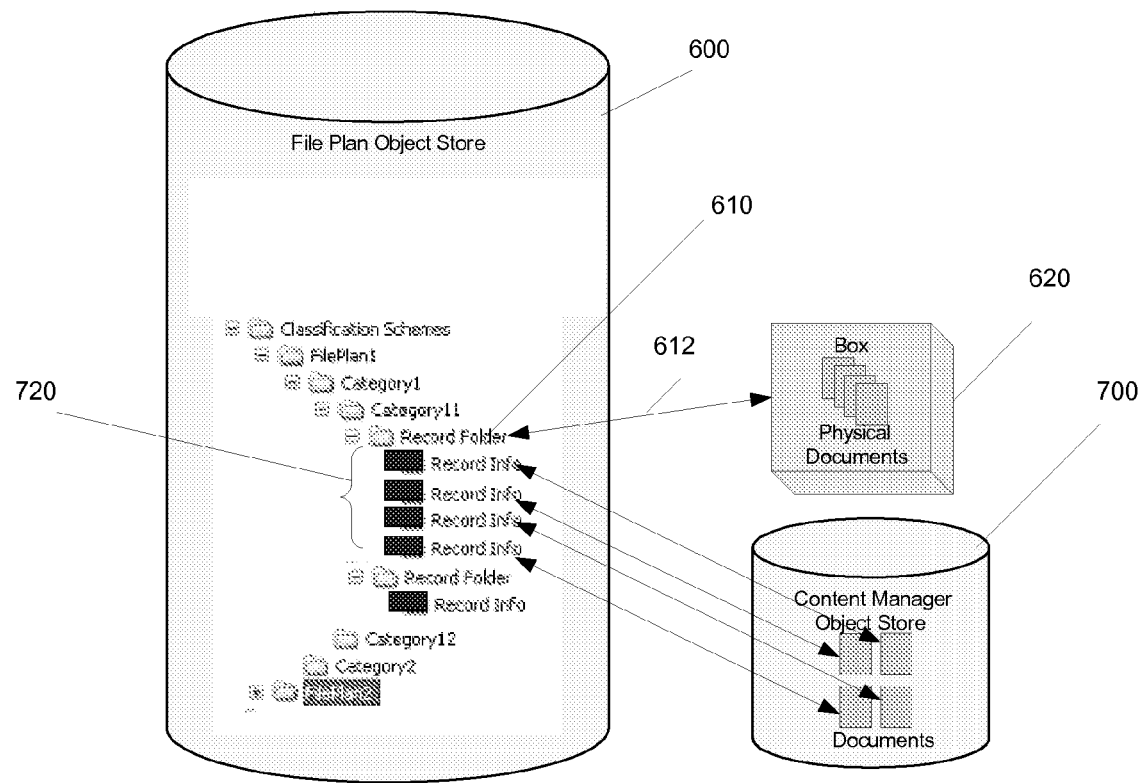
FIG. 7 illustrates an embodiment of a file plan object store and physical records after electronic records have been associated with the physical records.

FIG. 7 illustrates an embodiment of a file plan object store 600 and a box of physical records 620 after electronic records have been associated with the box of corresponding physical records 620. In particular, Record Info objects 720 of the record folder 610 each include links to electronic records (illustrated as "documents") in a content manager object store 700, and the electronic records correspond to physical records in the box of physical records 620.

Figure 8:
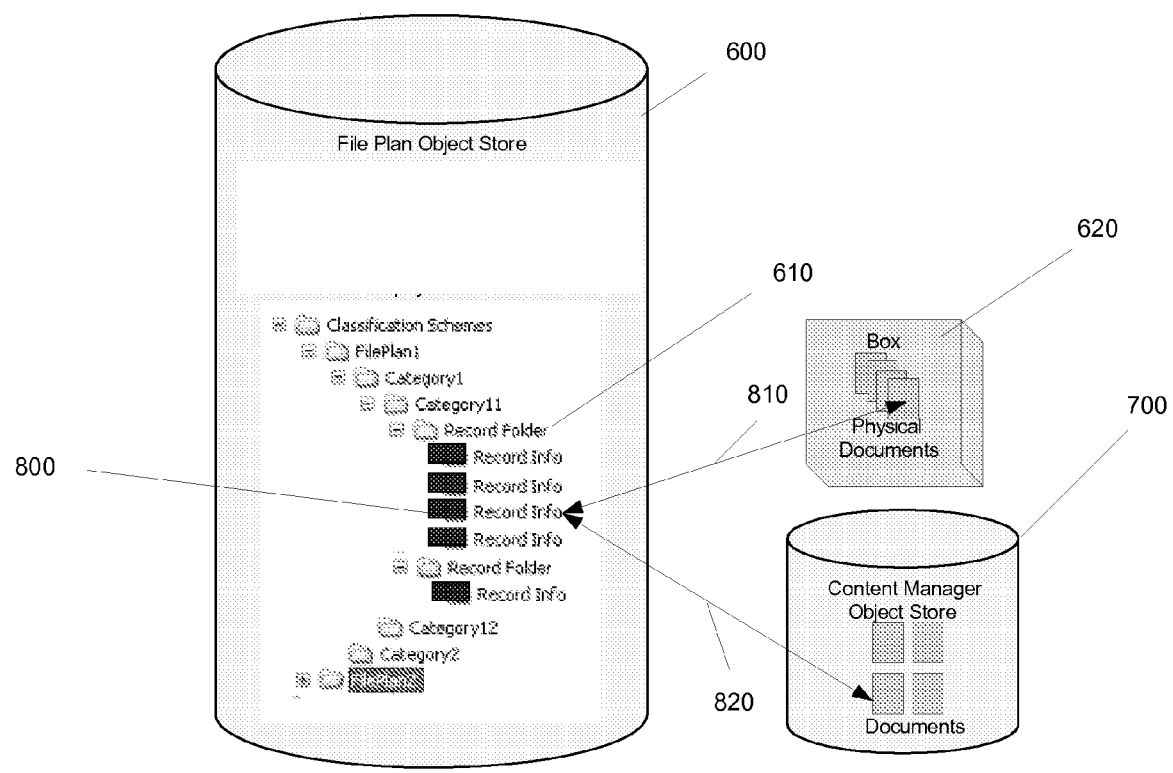
FIG. 8 illustrates an embodiment of a file plan object store and physical records after electronic records have been associated with the physical documents using dual links.

FIG. 8 illustrates an embodiment of a file plan object store 600 and a box of physical records 620 in which an existing RIO has multiple links, one to an electronic record and one to a corresponding physical record. In particular, one Record Info object 800 of the record folder 610 includes a link 810 to a physical record in the box of physical records 620 and a link 820 to the electronic records in a content manager object store 700.

As illustrated with FIG. 8, a folder with an RIO pointing to one or more physical records (e.g., a single physical box, folder or document) may also have another link on the same RIO to the electronic record associated with the one or more physical records.

Figure 9:
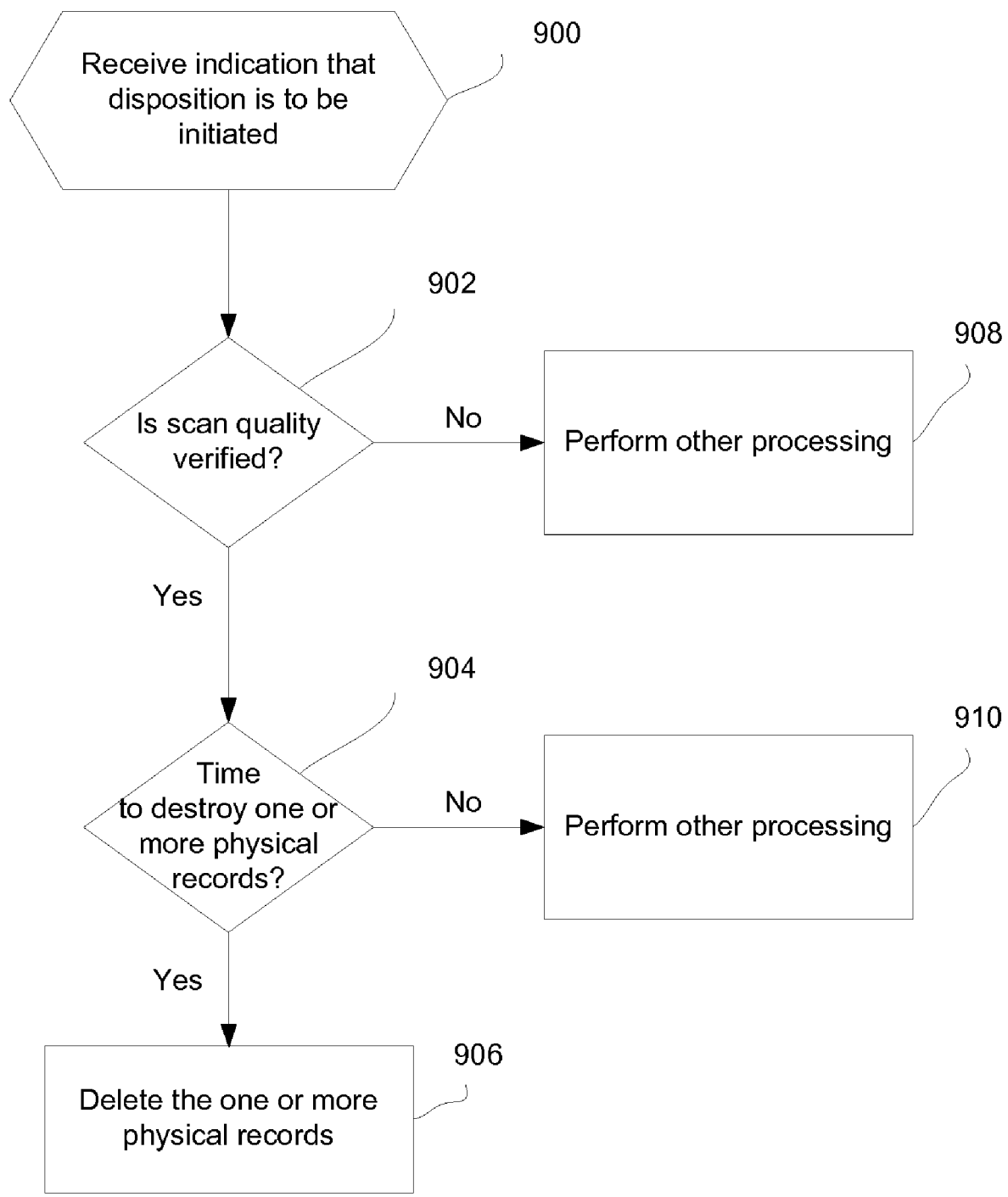
FIG. 9 illustrates an embodiment of logic performed by a records management application to dispose of one or more physical records.

FIG. 9 illustrates an embodiment of logic to dispose of one or more physical records. Control begins at block 900 with receipt of an indication that disposition is to be initiated. In block 902, a user determines whether the scan quality has been verified. If so, processing continues to block 904, otherwise processing continues to block 908. In block 908, other processing is performed, such as sending a user an indication that the scan should be verified.

In block 904, it is determined whether it is time to destroy one or more physical records. If so, processing continues to block 906, otherwise, processing continues to block 910. In block 906, a user destroys the one or more physical records. In block 910, other processing is performed. Thus, FIG. 9 illustrates an embodiment of logic for disposition of one or more physical records after determining that the scan quality has been verified to be acceptable, where acceptable may be defined differently in different embodiments.

Figure 10:
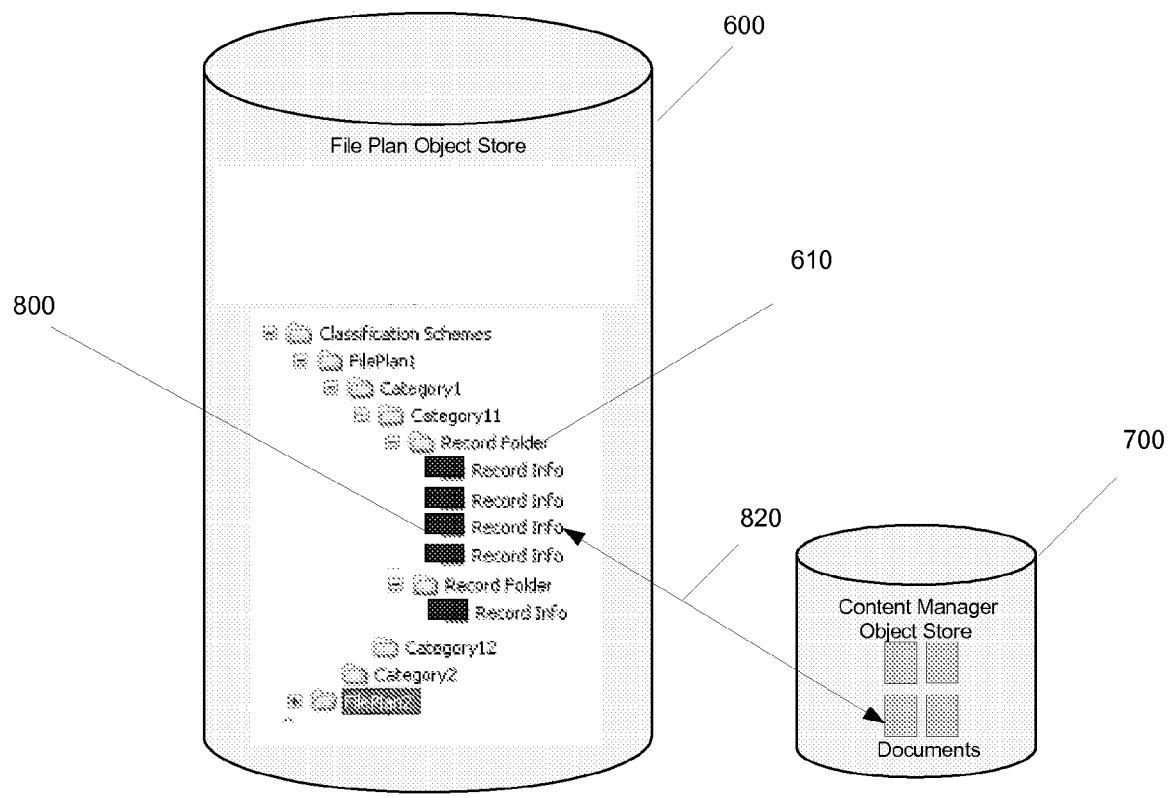

FIG. 10 illustrates an embodiment of a file plan object store 600 after physical records have been disposed of. FIG. 10 illustrates that the Record Info object 800 of the record folder 610 includes one link 820 to the electronic records in a content manager object store 700 after the physical records 620 (FIG. 8) are disposed of.

Thus, with embodiments, a multi-part disposition schedule is provided, in which associated physical and electronic records may be separately disposed of. For example, the disposition schedule might be as follows:

Destroy electronic record 10 years after case closed.

Destroy physical record 1 year after electronic record is verified to be a good copy of the physical record.

Thus, embodiments enable physical record content for which records exist to be converted to electronic form, without creating new separate records or altering the existing records.

Embodiments manage the transition from physical to electronic state and manage the disposition of physical and electronic components.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIGS. 5 and 9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The illustrated logic of FIGS. 5 and 9 may be implemented in software, hardware, programmable and non-programmable gate array logic or in some combination of hardware, software, or gate array logic.

FIGS. 2, 3, and 4 provide embodiments of information included in the RIO, file plan, and container. In alternative embodiments, the RIOs, file plan, and containers may include different or additional information.

Figure 11:
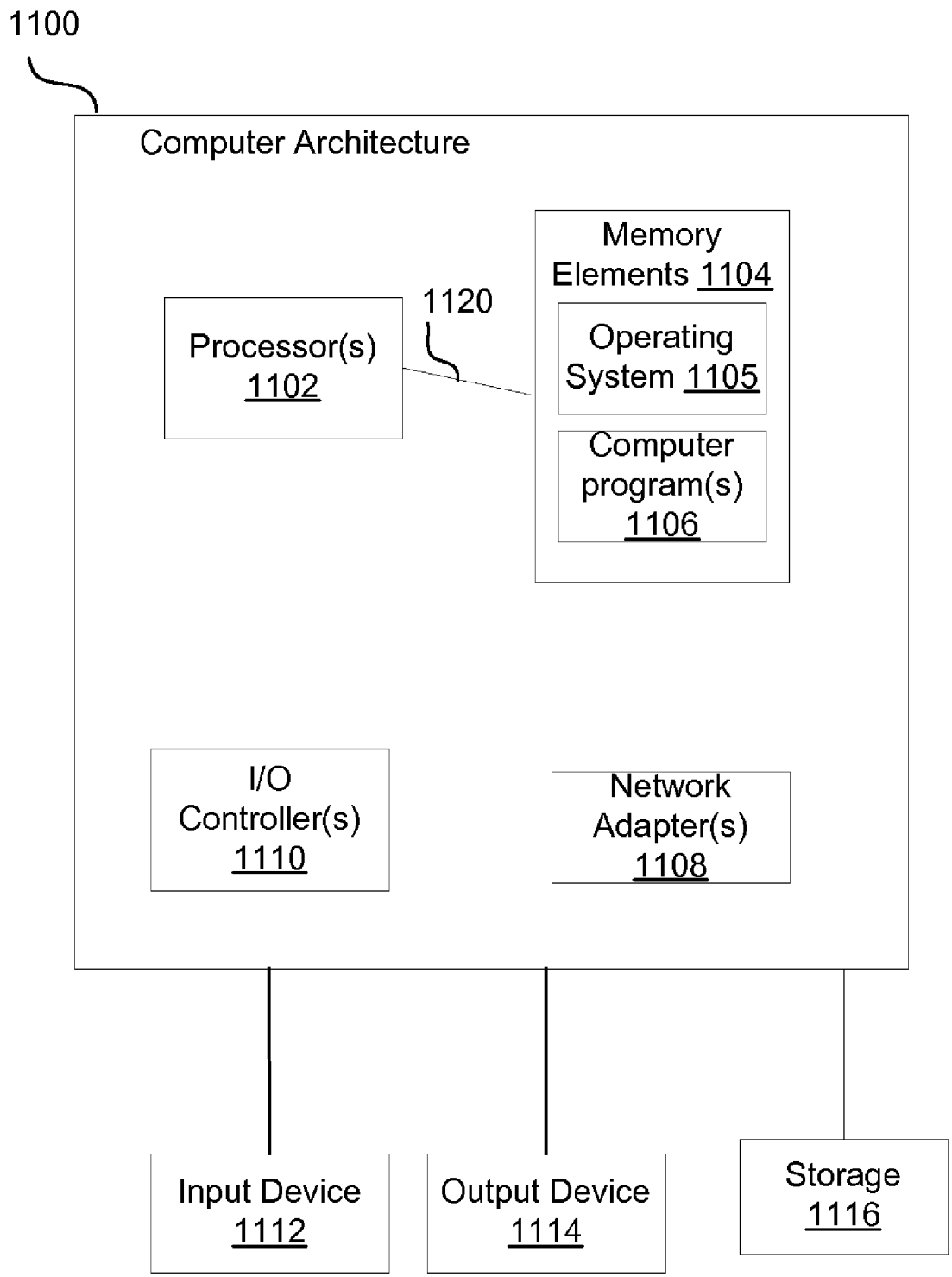
FIG. 11 illustrates an embodiment of a system architecture.

FIG. 11 illustrates an embodiment of a system architecture 1100. RM development, production, and quality assurance systems 130, 140*a* . . . 140*n*, and 150 may implement system architecture 1100. The system architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The system architecture 1100 may be coupled to storage 1116 (e.g., a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The system architecture 1100 may include fewer components than illustrated, additional components not illustrated herein, or some combination of the components illustrated and additional components. The system architecture 1100 may comprise any computing device known in the art, such as a mainframe, server, personal computer, workstation, laptop, handheld computer, telephony device, network appliance, virtualization device, storage controller, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended and/or any subsequently-filed claims, and their equivalents.

What is claimed is:

1. A method, comprising:
providing a file plan including a plurality of containers, wherein at least one of the containers comprises a plurality of record information objects (RIOs) and lifetime document management rules for the record information objects (RIOs), wherein each of the record information objects (RIOs) represents a document,
wherein the at least one of the containers points to a physical record, wherein the physical record is associated with an existing, first record information object (RIO) that provides metadata that describes the physical record, a location of the physical record, and hold information to override an attempt to dispose of the document represented by the first record information object (RIO), and wherein a first disposition schedule is associated with the first record information object (RIO);
storing an electronic record associated with the physical record that is associated with the first record information object (RIO);
generating a new, second record information object (RIO) that is associated with the electronic record that provides metadata that describes the electronic record and a location of the electronic record, and wherein a second disposition schedule is associated with the second record information object (RIO);
automatically associating the second record information object (RIO) with the first record information object (RIO) associated with the physical record; and
separately disposing of the physical record and the electronic record at different times based on the first disposition schedule associated with the first record information object (RIO) and the second disposition schedule associated with the second record information object (RIO).

2. The method of claim 1, further comprising:
in a record folder in the file plan, creating multiple record information objects (RIOs) by creating a record information object (RIO) for each of the physical records stored in a physical document location;
in response to creating electronic records of the physical records, storing the electronic records associated with the physical records in an object store; and
automatically associating the physical records in the physical document location with the electronic records in the object store by updating, in the record folder, the record information object (RIO) for each of the physical records to include a link to a corresponding electronic record to associate each of the electronic records to a same, existing record information object (RIO) with which a corresponding physical record is associated, wherein the record folder points to the physical document location and each record information object (RIO) points to an electronic record in the object store.

3. The method of claim 1, wherein at least some portion of metadata associated with the first record information object (RIO) is copied to the second record information object (RIO).

4. The method of claim 1, further comprising:
updating the first record information object (RIO) to include a second link to the electronic record, wherein the physical record and the electronic record have a same record information object (RIO) with the first link and the second link.

5. The method of claim 4, wherein the physical record comprises a group of physical records.

6. The method of claim 4, wherein disposing of the physical record further comprises:
removing the first link from the first record information object (RIO) to the physical record without removing the second link from the first record information object (RIO) to the electronic record.

7. A computer program product comprising a computer useable medium including a computer readable program, wherein the computer readable program when executed on a computer causes the computer to:
provide a file plan including a plurality of containers, wherein at least one of the containers comprises a plurality of record information objects (RIOs) and lifetime document management rules for the record information objects (RIOs), wherein each of the record information objects (RIOs) represents a document,
wherein the at least one of the containers points to a physical record, wherein the physical record is associated with an existing, first record information object (RIO) that provides metadata that describes the physical record, a location of the physical record, and hold information to override an attempt to dispose of the document represented by the first record information object (RIO), and wherein a first disposition schedule is associated with the first record information object (RIO);
store an electronic record associated with the physical record that is associated with the first record information object (RIO);
generate a new, second record information object (RIO) that is associated with the electronic record that provides metadata that describes the electronic record and a location of the electronic record, and wherein a second disposition schedule is associated with the second record information object (RIO);
automatically associate the second record information object (RIO) with the first record information object (RIO) associated with the physical record; and
separately disposing of the physical record and the electronic record at different times based on the first disposition schedule associated with the first record information object (RIO) and the second disposition schedule associated with the second record information object (RIO).

8. The computer program product of claim 7, wherein the computer readable program when executed on the computer causes the computer to:
in a record folder in the file plan, creating multiple record information objects (RIOs) by creating a record information object (RIO) for each of the physical records stored in a physical document location;
in response to creating electronic records of the physical records, store the electronic records associated with the physical records in an object store; and
automatically associate the physical records in the physical document location with the electronic records in the object store by updating, in the record folder, the record information object (RIO) for each of the physical records to include a link to a corresponding electronic record to associate each of the electronic records to a same, existing record information object (RIO) with which a corresponding physical record is associated, wherein the record folder points to the physical document location and each record information object (RIO) points to an electronic record in the object store.

9. The computer program product of claim 7, wherein at least some portion of metadata associated with the first record information object (RIO) is copied to the second record information object (RIO).

10. The computer program product of claim 7, wherein the computer readable program when executed on the computer causes the computer to:
   update the first record information object (RIO) to include a second link to the electronic record, wherein the physical record and the electronic record have a same record information object (RIO) with the first link and the second link.

11. The computer program product of claim 10, wherein the physical record comprises a group of physical records.

12. The computer program product of claim 10, wherein the computer readable program when executed on a computer causes the computer to:
   remove the first link from the first record information object (RIO) to the physical record without removing the second link from the first record information object (RIO) to the electronic record.

13. A system, comprising:
   hardware logic performing operations, the operations comprising:
   providing a file plan including a plurality of containers, wherein at least one of the containers comprises a plurality of record information objects (RIOs) and lifetime document management rules for the record information objects (RIOs), wherein each of the record information objects (RIOs) represents a document, wherein the at least one of the containers points to a physical record, wherein the physical record is associated with an existing, first record information object (RIO) that provides metadata that describes the physical record, a location of the physical record, and hold information to override an attempt to dispose of the document represented by the first record information object (RIO), and wherein a first disposition schedule is associated with the first record information object (RIO);
   storing an electronic record associated with the physical record that is associated with the first record information object (RIO);
   generating a new, second record information object (RIO) that is associated with the electronic record that provides metadata that describes the electronic record and a location of the electronic record, and wherein a second disposition schedule is associated with the second record information object (RIO);
   automatically associating the second record information object (RIO) with the first record information object (RIO) associated with the physical record; and
   separately disposing of the physical record and the electronic record at different times based on the first disposition schedule associated with the first record information object (RIO) and the second disposition schedule associated with the second record information object (RIO).

14. The system of claim 13, wherein the operations further comprise:
   in a record folder in the file plan, creating multiple record information objects (RIOs) by creating a record information object (RIO) for each of the physical records stored in a physical document location;
   in response to creating electronic records of the physical records, storing the electronic records associated with the records in an object store; and
   automatically associating the physical records in the physical document location with the electronic records in the object store by updating, in the record folder, the record information object (RIO) for each of the physical records to include a link to a corresponding electronic record to associate each of the electronic records to a same, existing record information object (RIO) with which a corresponding physical record is associated, wherein the record folder points to the physical document location and each record information object (RIO) points to an electronic record in the object store.

15. The system of claim 13, wherein at least some portion of metadata associated with the first record information object (RIO) is copied to the second record information object (RIO).

16. The system of claim 13, wherein the operations further comprise:
   updating the first record information object (RIO) to include a second link to the electronic record, wherein the physical record and the electronic record have a same record information object (RIO) with the first link and the second link.

17. The system of claim 16, wherein the physical record comprises a group of physical records.

18. The system of claim 16, wherein operations for disposing of the physical record further comprise:
   removing the first link from the first record information object (RIO) to the physical record without removing the second link from the first record information object (RIO) to the electronic record.

* * * * *